United States Patent [19]

Zhong et al.

[11] Patent Number: 5,015,909

[45] Date of Patent: May 14, 1991

[54] GLASS COMPOSITION AND METHOD FOR MANUFACTURING A HIGH PERFORMANCE MICROCHANNEL PLATE

[75] Inventors: William J. S. Zhong, Stamford; John A. Williams, Monroe, both of Conn.

[73] Assignee: Circon Corporation, Santa Barbara, Calif.

[21] Appl. No.: 458,849

[22] Filed: Dec. 29, 1989

[51] Int. Cl.$^5$ .............................................. C03C 3/108
[52] U.S. Cl. .................... 313/105 R; 501/61; 501/37
[58] Field of Search ............................ 501/11, 60, 61; 313/105 R

[56] References Cited

U.S. PATENT DOCUMENTS

| | | | |
|---|---|---|---|
| 4,520,115 | 5/1985 | Spett et al. | 501/60 |
| 4,721,690 | 1/1988 | Ross et al. | 501/60 |
| 4,737,475 | 4/1988 | Thomas et al. | 501/60 |

OTHER PUBLICATIONS

The *Handbook of Glass Manufacture*, Tooley Ogden PUB.

Primary Examiner—William R. Dixon, Jr.
Assistant Examiner—Alan A. Wright
Attorney, Agent, or Firm—Daniel J. Meaney, Jr.

[57] ABSTRACT

A glass composition consisting essentially of the following components present in the glass in the following mole percent ranges is shown:

CHART I

| CHEMICAL COMPOSITION RANGES | |
|---|---|
| | mole percent |
| $SiO_2$ | 58–68 |
| $Al_2O_3$ | 0–2 |
| $K_2O + Rb_2O + Cs_2O$ | 0–3 |
| PbO | 10–15 |
| $Bi_2O_3$ | 0.3–2.1 |
| MgO + CaO + BaO | 10–20.4 |
| $B_2O_3$ | 0–4 |
| $As_2O_3 + Sb_2O$ | 0.1–1.1 |

A glass composition for manufacturing a high performance microchannel plate is also shown. A microchannel plate made from a glass composition consisting essentially of components in the glass range as defined above is also shown. A method for making a non-porous glass tubing comprising a hollowed out central area and having a transformation temperature in range of about 570° C. to about 610° C., a liquidus temperature below 1000° C. wherein the composition consists essentially of the components described herein above and wherein the glass tubing has an average lineal coefficient of thermal expansion in the range of about $63 \times 10^{-7}$ per °C. to about $82 \times 10^{-7}$ per °C. at a temperature between 25° C. and 300° C. is shown.

39 Claims, 3 Drawing Sheets

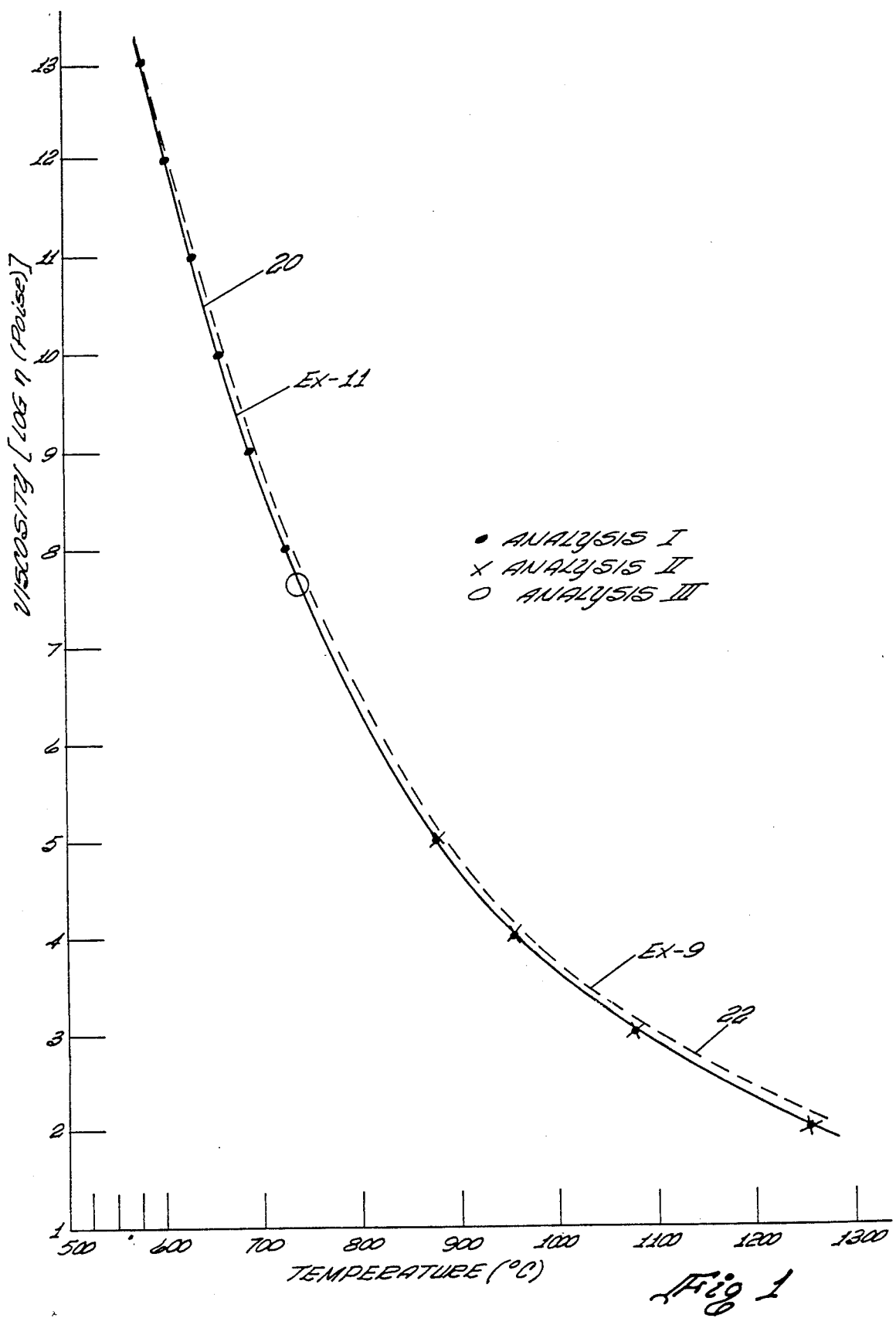

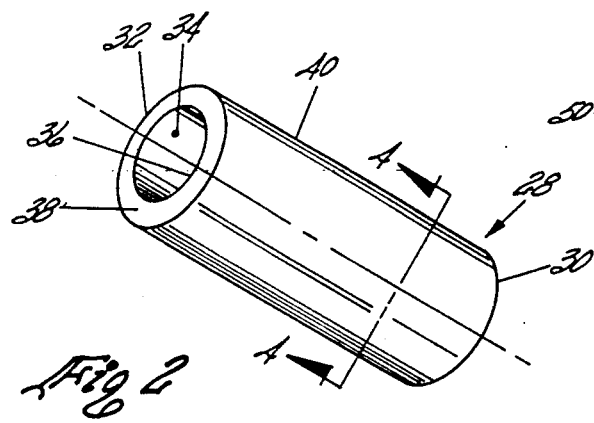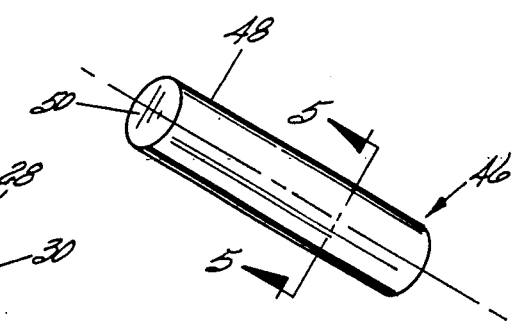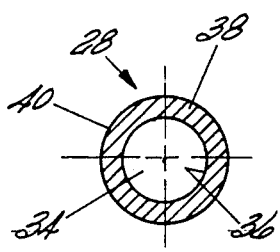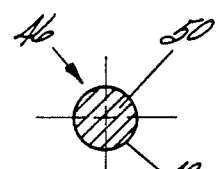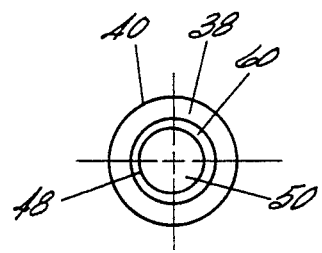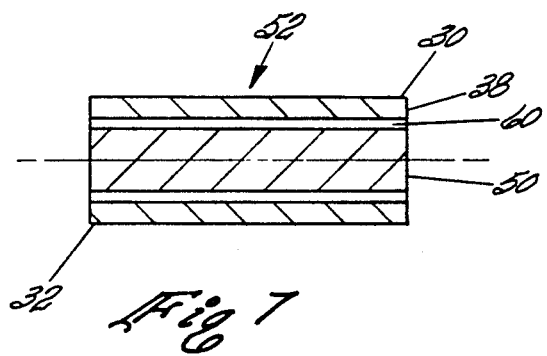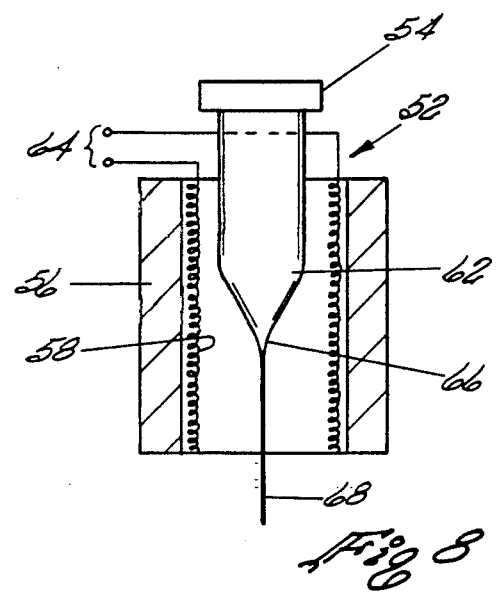

GLASS COMPOSITION AND METHOD FOR MANUFACTURING A HIGH PERFORMANCE MICROCHANNEL PLATE

BACKGROUND OF THE INVENTION

1. Field of the Invention

This invention relates to a glass composition suitable for use in manufacturing microchannel plates and more particularly applies to a glass composition consisting essentially of silicon dioxide ($SiO_2$), lead oxide (PbO), bismuth oxide ($Bi_2O_3$), boron oxide ($B_2O_3$), aluminum oxide ($Al_2O_3$), barium oxide (BaO) and cesium oxide ($Cs_2O$) which results in an improved microchannel plate having increased electron amplification capability and wherein the surface resistivity of the microchannel is substantially improved over the known prior glass compositions when treated with hydrogen gas.

2. Description of the Prior Art

Glass compositions suitable for use in manufacturing microchannel plates are well know in the art. One example of such a glass composition is disclosed in U.K. Patent Application GB 2 120 232 A filed May 16, 1983.

It is also known in the art to fabricate glass fiber optical devices comprising a clad glass and a core glass. Examples of such glass fiber optical devices are disclosed in U.S. Pat. Nos. 3,589,793, and 3,753,672. U.S. Pat. No. 3,753,672 discloses apparatus and a method for making glass fibers formed of a clad glass and a core glass.

The formation of microchannel plates and the process of making the same is well know in the art. Examples of such art is disclosed in U.S. Pat. Nos. 4,853,020, 4,737,013 and 4,629,486.

The description of the operation of a microchannel plate is known in the art. One example of prior art which describes the operation of a microchannel plate is an article entitled *Current Status of the Microchannel Plate* by S. Matsuura, S. Umebayashi, C, Okuyama, and K. Oba, which appeared in the IAAA Transactions on Science, Bol. NS-31, No. 1, February 1984 at pages 399 to 403 inclusive.

Another article entitled *The Microchannel Image Intensifier* by Michael Lampton which appeared in the Scientific American, November, 1981, at pages 62 to 71 inclusive, likewise describes microchannel plate operations.

The use of a microchannel plate as an electron multiplier is also well know in the art. Such devices which utilize microchannel plates are disclosed in U.S. Pat. Nos. 4,714,861; 3,341,730 and 3,128,408. A method for making a channel type electron multiplier is disclosed in U.S. Pat. No. 4,853,020.

In operation, microchannel plate electron multiplier devices are utilized with electromagnetic radiation sources and/or sources of electrons. Electromagnetic radiation received by a device is converted through an appropriate conversion device into electrons and the electrons are utilized as an input to the electron multiplier utilizing a channel type multichannel device. A multichannel device consists of a plurality of continuous path or microchannels through a thin glass plate. The microchannel paths have the walls thereof chemically and thermally treated to form an emissive layer. Secondary emissive properties are imparted to the walls as the result of such treatment. Electrons received at one end of a microchannel are transported through the paths or microchannels. During passage therethrough, each electron subsequently generates a large number of free electrons due to multiple collisions with the electron emissive treated surface.

The known glass compositions and the components present in the glass determine, to some extent the ability for the microchannel to be produced and to be chemically and thermally treated, so as to have appropriate resistivity characteristics such that a large electron multiplication can occur.

SUMMARY OF THE PRESENT INVENTION

The known glass compositions used in manufacturing microchannel plates fabricated from the know glass compositions have resulted in reaching a plateau wherein the number of electrons that can be generated by a microchannel are limited by the glass composition and components therein.

The glass composition of the present invention is a novel, unique and improved glass composition which can be utilized for manufacturing a high performance microchannel plate. The glass composition consists essentially of the following components present in the glass in the following mole percent ranges:

| | |
|---|---|
| $SiO_2$ | 58–68 |
| PbO | 10–15 |
| $Bi_2O_3$ | 0.3–2.1 |
| $B_2O_3$ | 2.0–3.8 |
| $Al_2O_3$ | 0.9–1.2 |
| BaO | 5.5–16.2 |
| $Cs_2O$ | 0.0–1.9 |

The glass composition of the present invention has a combination of components which interact such that when a glass tubing or shaped, non-porous tubing, is fabricated from the glass composition and the inner surfaces thereof are subsequently chemically and thermally treated to form an emissive layer. The formation of an emission layer is part of the process of preparing the microchannel plate wherein the surface resistivity thereof is greatly decreased or reduced which, in turn, increases the surface conductivity which then results in a larger number of electrons being produced by an electron multiplier fabricated from such a microchannel plate.

Therefore, one of the advantages of the present invention is that the glass composition consists essentially of the following components present in the glass in the following mole percentage ranges:

| | |
|---|---|
| $SiO_2$ | 58–68 |
| PbO | 10–15 |
| $Bi_2O_3$ | 0.3–2.1 |
| $B_2O_3$ | 2.0–3.8 |
| $Al_2O_3$ | 0.9–1.2 |
| BaO | 5.5–16.2 |
| $Cs_2O$ | 0.0–1.9. |

Another advantage of the present invention is that at least one component is selected from the group consisting of MgO and CaO, the total amount of which together with the BaO can be present in the glass in mole percent of 10–20.4.

Another advantage of the present invention is the glass composition can further contain at least one compound selected from the group consisting of $Rb_2O$ and $K_2O$, the total amount of which together with $Cs_2O$ can be present in the glass in mole percent of 0–3.0.

Another advantage of the present invention is the glass composition can contain components comprising $Sb_2O_3$ and $As_2O_3$ which can be present in the glass in mole percent of 0.1 to 1.1.

Another advantage of the present invention is the glass composition can further contain $Sb_2O_3$ which can be present in the glass in mole percent of 0-0.5.

Another advantage of the present invention is the glass composition can further contain $As_2O_3$ which can be present in the glass in mole percent of 0 through 0.6.

Another advantage of the present invention is that the glass composition can further consist of $Rb_2O$ which can be present in the glass in mole percent of 0-0.5.

Another advantage of the present invention is that the glass composition can further consist of $K_2O$ which can be present in the glass in mole percent of 0-3.0.

Another advantage of the present invention is that the glass composition can contain components $Cs_2O$, $Rb_2O$ and $K_2O$ which can be present in the glass in mole percent of 0-3.

Another advantage of the present invention is that a glass composition for manufacturing a high performance microchannel plate comprising a glass having the composition, as described herein, is taught by this invention.

Another advantage of the present invention is that a microchannel plate is made from a glass composition consisting of the components as described herein, is taught by the present invention.

Another advantage of the present invention is that a method for making a non-porous glass tubing comprising a hollowed out central area having a transformation temperature in range of about 570° C. to about 610° C. is taught by the present invention. The method comprises the steps of making a thermally stable glass melt having a liquidus temperature below 1000° C. wherein the composition consists essentially of the components described herein and when the total mole percent of $SiO_2 + PbO + BaO$ is at least 78; forming and shaping the glass tubing from the glass; and thereafter thermally annealing the glass in initial temperature range which is at least as high as annealing temperature of the glass for a sufficient period of time to produce an annealed elongated glass tubing wherein the glass tubing has an average lineal coefficient of thermal expansion in the range of about $63 \times 10^{-7}$ °C. to about $82 \times 10^{-7}$ °C. at a temperature between 25° C. and 300° C. is disclosed.

Another advantage of the present invention is that the step of forming and shaping the glass tube can include the step of extruding the glass tube from the glass.

Another advantage of the present invention is that the method step of forming and shaping the glass tube can include the method of forming and shaping a hollowed out central area of the tubing to define a cross-section having a predetermined shape.

Another advantage of the present invention is that the glass tubing can have an outer surface and wherein the step of forming and shaping includes forming and shaping the exterior surface and the hollowed out central area of the tubing into a circular cross-section to define an elongated cylindrically shaped tube having a selected wall thickness.

Another advantage of the present invention is that the method includes the step of cutting the elongated cylindrical shape type into selected axial lengths.

Another advantage of the present invention is that a shaped, non-porous glass tubing comprising a hollowed out central area having a transformation temperature in the range of about 570° C. to about 610° C. and a liquidus temperature below 1000° C. in which the glass has a composition consisting of the components described herein wherein the total mole percent of $SiO_2 + PbO + BaO$ is at least 78 and wherein the glass tubing has an average linear coefficient of thermal expansion at a range of about $63 \times 10^{-7}$ °C. to $82 \times 10^{-7}$ °C. at a temperature between 25° C. to 300° C. is shown.

Another advantage of the present invention is that a glass composition for core glass is disclosed for use in manufacturing a high performance microchannel plate wherein the core glass has excellent etching characteristics and substantially the same lineal coefficient of thermal expansion as the glass composition used for glass in a shaped, non-porous glass tubing used for manufacturing a high performance microchannel plate.

BRIEF DESCRIPTION OF THE DRAWINGS

These and other advantages of the invention will be readily apparent when considered in light of the detailed description hereinafter of the preferred embodiment and of the drawings which include the following figures:

FIG. 1 is a graph showing the plot of viscosity [log (poise)] plotted as a function of temperature (degree Celsius) for two samples of glass, one of which is based upon several analyses of the glass sample;

FIG. 2 is a perspective view of a glass clad tube formed of the glass composition of the present invention;

FIG. 3 is a perspective view of a core glass rod fabricated for use with the glass clad tubing;

FIG. 4 is a cross-sectional view taken along section lines 4—4 of FIG. 2;

FIG. 5 is a cross-sectional view taken along section line 5—5 of FIG. 3;

FIG. 6 is a pictorial representation, in cross-section, of a core glass rod of FIG. 3 inserted into the hollowed out central area of the glass clad tube of FIG. 2;

FIG. 7 is a pictorial cross-sectional representation showing the relationship between the glass clad tube, the core glass and a spacing therebetween forming a clad/core glass assembly;

FIG. 8 is a pictorial representation of a heating furnace utilized for fabricating a glass fiber from a glass clad/core glass assembly of FIG. 7;

DESCRIPTION OF THE PREFERRED EMBODIMENT

Figure 9:
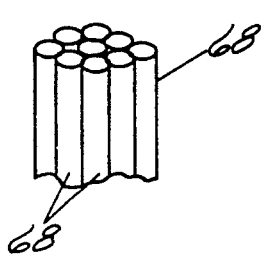
FIG. 9 is a pictorial representation of a plurality of single fibers formed into a fiber bundle.

Glass compositions used in the manufacture of microchannel plates determine the secondary emission properties and gain stability of the microchannel plate. In such microchannel plates, the count of electrons entering into a plurality of parallel microchannels is multiplied such that a plurality of electrons are emitted interiorly in the microchannel or path by the process of secondary emission. As such, each glass channel defines a microchannel for each electron that strikes it.

It is one teaching of the present invention that microchannel plates fabricated, assembled or manufactured from glasses having silicon dioxide ($SiO_2$) in mole percent of 58 to 68, lead oxide (PbO) in mole percent from 10 to 15, barium oxide (BaO) having mole percent of 5.5 to 16.2 and, other components of bismuth oxide ($Bi_2O_3$) having mole percent of 0.3 to 2.1, boron oxide ($B_2O_3$) having a mole percent in the order of 2.0 to 3.8, aluminum oxide ($Al_2O_3$) having a mole percentage of 0.9 through 1.2 and cesium oxide ($Cs_2O$) having a mole percent of 0.0 to 1.9 result in a microchannel having increased secondary emission properties and improved gain stability.

In order to increase the working temperatures, various additional components can be added to the glass composition to vary working temperature and other characteristics of the glass including its secondary emission properties.

Preferably, the glass composition of the present invention has a transformation temperature in a range of about 570° C. to about 610° C. The glass has a liquidus temperature below 1000° C. A glass having the glass composition and property of the present invention has a linear thermal expansion coefficient in the order of $63 \times 10^{-7}$ °C. to about $82 \times 10^{-7}$ °C. at a temperature between 25° C. and 300° C. Preferably, the surface conductivity, after hydrogen firing of the microchannel, will be in the order of about $10^{12}$ to about $10^{13}$ ohms per square. The physical properties would include a firing temperature greater than 550° C., a transformation temperature (Tg) of about 570° C. to about 610° C. and a Littleton softening temperature (T7.6) when $n = 10^{7.6}$ is about 720° C. to about 790° C. The working temperature (when the temperature $n = 10^4$ poise) is in the range of about 945° C. to about 1000° C.

Preferably, the chemical solubility is less than 0.05 milligrams per $cm^2$ per hour in a 10% hydrochloric acid solution at 20° C.

Typically, the chemical composition ranges of the various elements in the preferred embodiment are as follows:

CHART I

| CHEMICAL COMPOSITION RANGES | |
|---|---|
| | mole percent |
| $SiO_2$ | 58–68 |
| $Al_2O_3$ | 0–2 |
| $K_2O + Rb_2O + Cs_2O$ | 0–3 |
| PbO | 10–15 |
| $Bi_2O_3$ | 0.3–2.1 |
| MgO + CaO + BaO | 10–20.4 |
| $B_2O_3$ | 0–4 |
| $As_2O_3 + Sb_2O_3$ | 0.1–1.1 |

The compositions and examples of compositions for practicing the invention is set forth in Chart II A and B hereinbelow.

CHART II

EXAMPLES OF GLASS COMPOSITION
PART A

| Components | Ex-1 | Ex-2 | Ex-3 | Ex-4 | Ex-5 |
|---|---|---|---|---|---|
| $SiO_2$ | 68.0 | 66.0 | 63.0 | 63.8 | 61.0 |
| $Al_2O_3$ | 1.0 | 1.0 | 1.2 | 1.2 | 0.9 |
| $K_2O$ | 3.0 | 1.0 | — | 1.0 | — |
| $Rb_2O$ | — | — | — | — | 0.5 |
| $Cs_2O$ | — | 0.3 | — | 0.4 | 1.3 |
| PbO | 10.0 | 13.0 | 13.0 | 12.0 | 12.0 |
| BaO | 8.0 | 9.8 | 10.0 | 5.5 | 15.4 |
| CaO | 5.0 | 5.0 | 5.0 | 5.9 | — |
| MgO | — | — | — | 5.0 | 3.0 |
| $Bi_2O_3$ | 2.0 | 2.1 | 2.1 | 1.5 | 1.0 |
| $B_2O_3$ | 2.0 | 2.6 | 3.0 | 3.5 | 3.8 |
| $As_2O_3$ | 0.5 | — | 0.5 | — | 0.6 |
| $Sb_2O_3$ | 0.5 | 0.1 | 0.2 | 0.2 | 0.5 |
| Lineal coefficient of thermal expansion ($\times 10^{-7}$/°C.) (25° C.–300° C.) | 75 | 69 | 70 | 63 | 82 |
| $T_g$ | 578 | 573 | 599 | 575 | 576 |
| $T_{7.6}$ | 745 | 728 | 786 | 755 | 725 |

CHART II

PART B

| Components | Ex-6 | Ex-7 | Ex-8 | Ex-9 | Ex-10 | Ex-11 |
|---|---|---|---|---|---|---|
| $SiO_2$ | 61.2 | 61.5 | 62.1 | 63.0 | 58.0 | 61.9 |
| $Al_2O_3$ | 0.9 | 1.2 | 0.9 | 1.1 | 2.0 | 1.1 |
| $K_2O$ | — | — | — | — | — | — |
| $Rb_2O$ | 0.5 | 0.4 | 0.5 | 0.4 | — | 0.4 |
| $Cs_2O$ | 1.7 | 1.7 | 1.7 | 1.2 | 0.8 | 1.5 |
| PbO | 12.0 | 11.8 | 12.0 | 11.4 | 15.0 | 11.6 |
| BaO | 16.2 | 12.0 | 12.8 | 12.0 | 9.5 | 12.0 |
| CaO | — | 4.2 | 3.0 | 4.3 | 6.0 | 4.1 |
| MgO | 2.5 | 2.6 | 3.0 | 2.2 | 4.9 | 2.7 |
| $Bi_2O_3$ | 0.6 | 0.5 | 0.3 | 0.5 | 0.6 | 0.5 |
| $B_2O_3$ | 3.8 | 3.8 | 3.3 | 3.6 | 3.0 | 3.9 |
| $As_2O_3$ | 0.6 | 0.2 | 0.4 | 0.2 | — | 0.2 |
| $Sb_2O_3$ | 0.1 | 0.1 | — | 0.1 | 0.2 | 0.1 |
| Lineal coefficient of thermal expansion ($\times 10^{-7}$/°C.) (25° C.–300° C.) | 77 | 78 | 79 | 77 | 74 | 76 |
| $T_g$ | 590 | 587 | 585 | 584 | 573 | 582 |
| $T_{7.6}$ | 733 | 741 | 739 | 750 | 762 | 743 |

The composition of the preferred embodiment of the invention is presented in the column under Example Ex-9 in the above described table.

The components utilized in the above described glass compositions is prepared from appropriate raw materials in proportions to supply to specific amounts of oxide components by standard melting practices.

In addition to the preferred glass composition identified as Ex-9 in the above Chart II(B), the compositions identified in examples Ex-1 through Ex-8, and Ex-10 and Ex-11 likewise result in a glass composition which, when manufactured into microchannel plates, have high performance characteristics in terms of improved secondary emission and gain stability.

The glass compositions described in Example 1 (Ex-1) through Example 11 (Ex-11) in the above chart result in a glass composition consisting essentially of the forming components present in the glass in the following low percent ranges:

CHART III

Minimum Components for Glass Composition for Manufacturing High Performance Multi-Channel Plates

| Components | Mole Percent Ranges |
| --- | --- |
| $SiO_2$ | 58–68 |
| PbO | 10–15 |
| $Bi_2O_3$ | 0.3–2.1 |
| $B_2O_3$ | 2.0–3.8 |
| $Al_2O_3$ | 0.9–1.2 |
| BaO | 5.5–16.2 |
| $Cs_2O$ | 0.0–1.9 |

The graph of FIG. 1 is a plot of the viscosity [(log n (poise)] plotted as a function of temperature in °C. The solid line 20 is Example 11 (Ex-11) in the Chart II B set forth above. The viscosity-temperature curve is based upon various measured values of viscosity which were measured using three different melts of glass of the same composition. As such, the viscosity-temperature curve 20 depicts the desired characteristic of a glass composition of the present invention. The preferred embodiment of the glass composition is Example 9 (Ex-9) shown. The viscosity-temperature curve for Example 9 (Ex-9) is depicted by dashed line 22.

Based upon the viscosity-temperature curve of Examples 9 and 11, it is readily apparent that the viscosity at the liquidus temperature stage is less than $10^4$. At firing temperature which is greater than 550° C., and the viscosity of the glass is well in excess of $10^{13}$ poise. At the Littleton softening point ($T_{7.6}$), the temperature is in the range of about 720° C. to about 790° C. In the working temperature of about 945° C. to about 1000° C., the viscosity of the glass is in the range of about $10^3$ to about $10^5$ poise.

The perspective view of FIG. 2 shows a glass clad tube, shown generally as 28, formed of a glass composition of the present invention. The glass clad tube 28 has two ends which are shown as ends 30 and 32. The glass clad tube is cylindrical in shape and has a hollowed out central area 34 and an interior surface 36. The cross-sectional shape of the hollowed out central area 34 is preferably circular in cross-section. Also, the exterior surface 40 of the glass clad tube 28 is circular. As such, the outer surface 40 and the hollowed out central area 34 define a thick wall 38 to form the hollow glass tube 28. The hollowed out central area 34 extends axially through the center of the glass tube 28.

FIG. 3 is a perspective view of a core glass rod, shown generally as 46. The glass rod 46 can be formed from any one of several known glass core compositions which is capable of being chemically etched. Several examples of compatible core glass can have the following composition:

CHART IV

| CORE GLASS EXAMPLES | | | | |
| --- | --- | --- | --- | --- |
| | mole percent | | | |
| | Ex-A | Ex-B | Ex-C | Ex-D |
| $SiO_2$ | 35.0 | 35.1 | 42.1 | 39.3 |
| $B_2O_3$ | 26.1 | 26.1 | 22.7 | 26.1 |
| CaO | — | 6.5 | — | — |
| $B_2O$ | 27.3 | 20.9 | 31.2 | 24.6 |
| ZnO | — | — | — | 2.6 |
| $Y_2O_3$ | — | — | 1.2 | 1.4 |
| $Re_2O_3$ | 10.4 | 10.4 | 2.3 | 5.7 |
| $As_2O_3$ | 0.6 | 0.5 | — | — |

CHART IV-continued

| CORE GLASS EXAMPLES | | | | |
| --- | --- | --- | --- | --- |
| | mole percent | | | |
| | Ex-A | Ex-B | Ex-C | Ex-D |
| $Sb_2O_3$ | 0.6 | 0.6 | 0.5 | 0.4 |

*$Re_2O_3$ refers to any one or more of the Lanthanum Group rare earth oxides as specified in the appropriate example.

These glass core compositions have excellent etching characteristics and substantially the same lineal coefficient of thermal expansion as the glass composition used for the glass clad tube 28.

A glass composition for core glass for use in manufacturing a high performance microchannel plate consisting essentially of the following composition in mole percent ranges:

CHART V

| CORE GLASS RANGES | |
| --- | --- |
| | mole percent |
| $SiO_2$ | 35–43 |
| $B_2O_3$ | 22–28 |
| CaO | 0–6.5 |
| BaO | 20–32 |
| ZnO | 0–3 |
| $Y_2O_3$ | 0–1.4 |
| $As_2O_3$ | 0.5–0.6 |
| $Sb_2O_3$ | 0.4–0.6 |
| $Re_2O_3$ | 2.3–10.4 | wherein the $Re_2O_3$ comprises any one or more of the Lanthanum Group rare earth oxides, the total mole percent of which is within the above mole percent ranges for $Re_2O_3$.

The core glass rod 46 is solid in cross-section as depicted by the solid end 50. The exterior shape of the glass rod 46, defined by the exterior surface 48, is generally circular in cross-section. The diameter of the glass rod 46 is less than the diameter of the hollowed out central area 34 as defined in the glass tube 28 of FIG. 2. FIG. 2 shows that the hollowed out central area 34 defines an interior surface 36 which would be spaced from the exterior surface 48 of the glass rod of FIG. 3.

FIG. 4 is a cross-sectional view taken along section lines 4—4 of FIG. 2 showing the details of the cross-section of the glass clad tube 28. The glass clad tube 28 has an exterior surface 40, a hollowed out central area 34, an interior surface 36 and a thick wall 38.

FIG. 5 is a cross-sectional view taken along section line 5—5 of FIG. 3 showing that the cross-section 50 of glass rod 46 is circular in cross-section and has an exterior surface 48.

FIG. 6 is a pictorial representation, in cross-section, of the core glass rod 46 of FIG. 3 inserted into the hollowed out central area 34 of the glass clad tube 28 of FIG. 2. FIG. 6 illustrates that the exterior surface 48 of the glass rod 46 is spaced a predetermined distance from the inner surface 36 of thick wall 38 of the glass clad tube 28. The distance therebetween is referred to as space 650 and provides a means for permitting relative movement of the glass rod 46 within the interior of the glass clad tube 28. The width of the spacing could be in the order of about 0.001" to about 0.010". The spacing widths determined by a number of factors such as, for example, the bow of the glass rod 46, the tolerances of the hollowed out central area 34 of the glass clad tube 28 and the like.

FIG. 7 is a pictorial cross-section representation showing the relationship between the glass clad tube 28 and the glass rod 46. The combination is referred to as a clad/core glass assembly 52. Typically, the glass clad tube 28 and the glass rod 46 are fabricated of clear glass, with the glass composition of the glass rod 46 being susceptible to chemical etching by an appropriate etching solution.

In order to produce the beginning fiber preform which is utilized in manufacturing a microchannel plate, the clad/core glass assembly 52 is drawn into a glass fiber in accordance with the pictorial representation of a heating furnace illustrated in FIG. 8.

To form a glass fiber, the clad/core glass assembly 52 is slowly fed downwards into furnace 56. In FIG. 8, the core glass assembly 52 has a holder 54 on top thereof to support and transport the subassembly 52 downward into the furnace 56. In the example of FIG. 8, the furnace 56 includes heating coils 58 which are heated by applying electrical energy through input terminals 64. The heating coils 58 within the furnace 56 heat the lower end of the clad/core glass assembly 52 at point 62. As the subassembly is fed downward, the glass begins a viscous flow. The glass exhibits viscous flow to form a cone 66 as illustrated in FIG. 8.

In FIG. 8, the glass melting begins by forming or pulling a glass rod from cone 66 and extending the rod past the bottom of the furnace 46 where the rod then begins to harden. The rod is removed and the glass is then drawn downward forming a glass fiber 68. The fiber 68 is continuously drawn off of the viscous cone 66.

The clad/core glass subassembly 52 is fed slowly into the furnace such that the lower end thereof is continuously heated and maintained at a constant temperature. The glass fiber 68 is drawn off the continuously heated subassembly at a continuous rate of speed forming a uniform diameter fiber. Further, the clad tube and the glass core are fused together so that the fiber consists of a solid center core with a fused outer coating. The center core is of uniform diameter as is the outer core and the outer core is completely coated with no breaks, cracks or the like.

FIG. 9 is a pictorial representation of a plurality of drawn fibers 68 depicted as 68 formed into a multi fiber assembly. As illustrated in FIG. 9, the fibers are individual cylindrical rods which have been reduced to a desired size, say in the order of 4,000 to 1. Each fiber 68 includes a glass core whose outer periphery is surrounded by a glass clad layer.

As noted hereinbefore, the core of each of the fibers 68 is fabricated of material such that the core glass is etchable in an appropriate etching solution such that the core glass can be removed during subsequent processing to form a microchannel plate. The glass clad tube is made from a glass composition which has a softening temperature substantially the same as that of the glass core. Typically, the glass material of the clad tube is different from the glass material of the core glass in that the glass clad tube has a higher lead content which renders it non-etchable under those conditions used for etching the core glass material. As such, the clad tube remains after the chemical etching of the glass core and becomes a means defining a pathway for electrons in the form of a chemically and thermally treated channel which is defined within the hollowed out central area of the clad glass.

Figure 10:
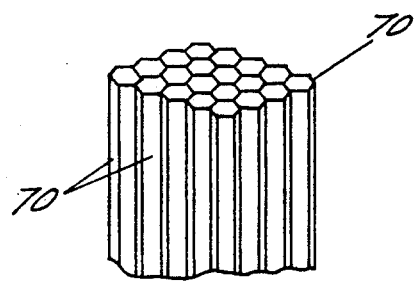
FIG. 10 is a pictorial representation of a multifiber form fabricated of the glass fibers illustrated in FIG. 9.

Several thousand of the fibers 68, illustrated in FIG. 9, are cut into lengths of single fibers which are then clamped together and then heated and drawn, at an appropriate drawing temperature of the glass in order to form a hexagonal array 70 illustrated in FIG. 10.

A plurality of hexagonal arrays 70, each having several thousand single fibers, are assembled into a multi-assembly. The multi-assembly is fused together in a furnace at appropriate temperatures to maintain the hexagonal configuration within an annular outer ring. The fused multi-assembly is ultimately cut into individual wafers to form microchannel plates 80.

Figure 11:
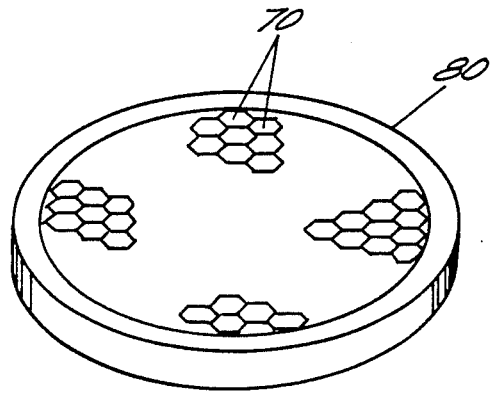
FIG. 11 is a pictorial representation of a multi-channel plate formed from multifiber forms illustrated in FIG. 10.

FIG. 11 is a pictorial representation of a wafer 80 having a plurality of multi-assemblies 70 formed therein which is utilized for forming a multichannel plate. Subsequently, the wafer is subject to further processing to form the microchannels.

Figure 12:
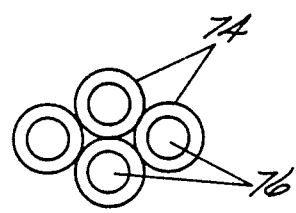
FIG. 12 is a pictorial representation of a plurality of microchannels formed in a microchannel plate illustrated in FIG. 11 wherein the core glass has been removed to form a path or microchannel.
Figure 13:
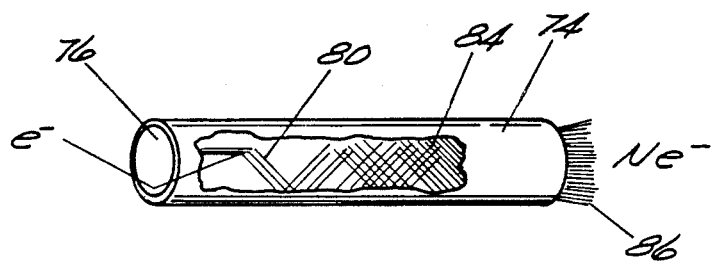
FIG. 13 is a pictorial representation of a single microchannel wherein the inner surface thereof has been chemically and thermally treated to form an emissive material and where an electron ($e^-$) received thereby is transported therethrough to produce a plurality of "N" electrons ($Ne^-$) as an output.

As illustrated in FIG. 12, the microchannels are formed by chemically etching the core glass from area 76, preferably by etching with a dilute acid. After etching, the clad glass 74 remains to form a microchannel which is illustrated in FIG. 13. Also, the clad glass 74 remains solid and provides a mechanical support for the wafer 80 illustrated in FIG. 11.

After etching, the microchannel plates are heat treated in an atmosphere of hydrogen gas whereby certain reducible oxides, such as lead oxide, are reduced to render the clad tube inner channel surface electronically conductive. In this way, a semiconductor layer is formed in each of the glass clad interior surfaces and the latter extends inwardly from the surface which defines a microchannel 76.

FIG. 13 is a pictorial representation of a microchannel 76 which has the interior surface thereof chemically and thermally treated to make the same subject to secondary emission. When electron e⁻ enters into the microchannel 76, it collides with the secondary emissive interior surface causing other electrons, such as electrons shown by lines 80, to be emitted from the secondary emission surface. The electrons e⁻ emitted by the first collision again collide with the secondary emissive surface producing additional electrons shown by lines 84 which results in the amplification of the electron e⁻ as it is transported through the microchannel 76. The electron e⁻ is amplified to produce Ne⁻ as depicted by electrons being emitted in the form of Ne⁻ electrons shown as 86 in FIG. 13.

It is envisioned that the microchannel plates could be used in a wide variety of applications, such as for detecting charged particles, UV-Photon detection, X-ray and ion detection and for night vision glasses.

What is claimed is:

1. A glass composition comprising the following components present in the glass in the following mole percent ranges:

| | |
|---|---|
| $SiO_2$ | 58–68 |
| $PbO$ | 10–15 |
| $Bi_2O_3$ | 0.3–2.1 |
| $B_2O_3$ | 2.0–3.8 |
| $Al_2O_3$ | 0.9–1.2 |
| $BaO$ | 5.5–16.2 |
| $Cs_2O$ | 0.0–1.9. |

2. The glass composition of claim 1 further containing at least one component selected from the group consisting of MgO and CaO, the total amount of which together with BaO are present in the glass in mole percent of 10–20.4.

3. The glass composition of claim 1 further containing at least one compound selected from the group consisting of Rb$_2$O and K$_2$O, the total of which together with Cs$_2$O are present in the glass in mole percent of 0–3.

4. The glass composition of claim 1 further containing Sb$_2$O$_3$ and wherein the components Sb$_2$O$_3$ and As$_2$O$_3$ are present in the glass in mole percent of 0.1–1.1.

5. The glass composition of claim 1 further containing Sb$_2$O$_3$ which is present in the glass in mole percent of 0–0.5.

6. The glass composition of claim 1 further containing As$_2$O$_3$ which is present in the glass in mole percent of 0–0.6.

7. The glass composition of claim 2 further consisting of Rb$_2$O which is present in the glass in mole percent of 0–0.5.

8. The glass composition of claim 7 further consists of K$_2$O which is present in the glass in mole percent of 0–3.0.

9. The glass composition of claim 8 wherein the components Cs$_2$O, Rb$_2$O and K$_2$O are present in the glass in mole percent of 0–3.

10. A glass composition of claim 1 wherein the glass consists of approximately the following composition in mole percent:

| | |
|---|---|
| SiO$_2$ | 63.0 |
| PbO | 11.4 |
| Bi$_2$O$_3$ | 0.5 |
| B$_2$O$_3$ | 3.6 |
| Al$_2$O$_3$ | 1.1 |
| BaO | 12.0 |
| Cs$_2$O | 1.2 |
| Sb$_2$O$_3$ | 0.1 |
| As$_2$O$_3$ | 0.2 |
| Rb$_2$O | 0.4 |
| CaO | 4.3 |
| MgO | 2.2 |

11. A glass composition of claim 1 wherein the glass consists approximately of the following composition in mole percent:

| | |
|---|---|
| SiO$_2$ | 62.1 |
| PbO | 12.0 |
| Bi$_2$O$_3$ | 0.3 |
| B$_2$O$_3$ | 3.3 |
| Al$_2$O$_3$ | 0.9 |
| BaO | 12.8 |
| Cs$_2$O | 1.7 |
| Sb$_2$O$_3$ | 0.1 |
| As$_2$O$_3$ | 0.4 |
| Rb$_2$O | 0.5 |
| CaO | 3.0 |
| MgO | 3.0 |

12. A microchannel plate comprising substantially parallel surfaces wherein a plurality of glass fibers are fused together, and the cores thereof etched, and extend between said parallel surfaces, said glass fibers being made from a glass composition comprising the following components in the glass in the following mole percent ranges:

| | |
|---|---|
| SiO$_2$ | 58–68 |
| PbO | 10–15 |
| Bi$_2$O$_3$ | 0.3–2.1 |
| B$_2$O$_3$ | 2.0–3.8 |
| Al$_2$O$_3$ | 0.9–1.2 |
| BaO | 5.5–16.2 |
| Cs$_2$O | 0.0–1.9. |

13. The microchannel plate of claim 12 wherein the glass composition further contains at least one component selected from the group consisting of MgO and CaO, the total amount of which together with BaO are present in like glasses in mole percent of 10–20.4.

14. The microchannel plate of claim 13 wherein the glass composition further contains at least one compound selected from the group consisting of Rb$_2$O and K$_2$O, the total of which together with Cs$_2$O are present in the glass in mole percent of 0–3.

15. The microchannel plate of claim 13 wherein the glass composition further contains the components Sb$_2$O$_2$ and As$_2$O$_3$ in the glass in mole percent of 0.1–1.1.

16. The microchannel plate of claim 13 wherein the glass composition further contains Sb$_2$O$_3$ which is present in the glass in mole percent of 0–0.5.

17. The microchannel plate of claim 13 wherein the glass composition further contains As$_2$O$_3$ which is present in the glass in mole percent of 0–0.6.

18. The microchannel plate of claim 14 wherein the glass composition further contains Rb$_2$O which is present in the glass in mole percent of 0–0.5.

19. The microchannel plate of claim 18 wherein the glass composition further consists of K$_2$O which is present in the glass in mole percent of 0–3.0.

20. The microchannel plate of claim 19 wherein the components Cs$_2$O, Rb$_2$O and K$_2$O are present in the glass in mole percent of 0–3.0.

21. A microchannel plate comprising substantially parallel surfaces wherein a plurality of glass fibers are fused together and extend between said parallel surfaces, said glass fibers being made from a glass composition comprising the following components in the glass in the following mole percent ranges:

| | |
|---|---|
| SiO$_2$ | 58–68 |
| PbO | 10–15 |
| Bi$_2$O$_3$ | 0.3–2.1 |
| B$_2$O$_3$ | 2.0–3.8 |
| Al$_2$O$_3$ | 0.9–1.2 |
| MgO + CaO + BaO | 10–20.4 |
| Cs$_2$O | 0.0–1.9 |
| As$_2$O$_3$ + Sb$_2$O$_3$ | 0.1–1.1. |

22. The microchannel plate of claim 21 wherein glass composition comprises the following composition in mole percent:

| | |
|---|---|
| SiO$_2$ | 63.0 |
| PbO | 11.4 |
| Bi$_2$O$_3$ | 0.5 |
| B$_2$O$_3$ | 3.6 |
| Al$_2$O$_3$ | 1.1 |
| BaO + MgO + CaO | 18.6 |
| Cs$_2$O | 1.2 |

23. A shaped non-porous glass tubing comprising a hollowed out central area, said glass tubing being formed of a glass composition having a transformation temperature in the range of about 570° C. to about 610° C. and a liquidus temperature below 1000° C., said glass having a composition comprising the following components, present in the glass, in the following mole percent:

| | | |
|---|---|---|
| $SiO_2$ | 58-68 | |
| PbO | 10-15 | |
| $Bi_2O_3$ | 0.3-2.1 | |
| $B_2O_3$ | 2.0-3.8 | |
| $Al_2O_3$ | 0.9-1.2 | |
| BaO + MgO + CaO | 5.5-16.2 | |
| $Cs_2O$ | 0.0-1.9 | | wherein the total mole percent of $SiO_2+PbO+BaO$ is in the range of about 78 to about 90 and wherein said glass tubing has an average lineal coefficient of thermal expansion in the range of about $63 \times 10^{-7}$ per °C. to about $82 \times 10^{-7}$ per °C. at a temperature between 25° C. and 300° C.

24. The shaped non-porous glass tubing of claim 23 wherein said glass composition further contains at least one component selected from the group consisting of MgO and CaO, the total amount of which together with BaO are present in the glass in mole percent of 10-20.4.

25. The shaped non-porous glass tubing of claim 23 wherein said glass composition further contains at least one compound selected from the group consisting of $Rb_2O$ and $K_2O$, the total of which together with $Cs_2O$ are present in the glass in mole percent of 0-3.

26. The shaped non-porous glass tubing of claim 23 wherein the glass composition components $Sb_2O_3$ and $As_2O_3$ are present in the glass in mole percent of 0.1-1.1.

27. The shaped non-porous glass tubing of claim 23 wherein said glass composition further contains $Sb_2O_3$ which is present in the glass in mole percent of 0-0.5.

28. The shaped non-porous glass tubing of claim 23 wherein said glass composition further contains of $As_2O_3$ which is present in the glass in mole percent of 0-0.6.

29. The shaped non-porous glass tubing of claim 24 wherein said glass composition further contains $Rb_2O$ which is present in the glass in mole percent of 0-0.5.

30. The shaped non-porous glass tubing of claim 29 wherein said glass composition further contains $K_2O$ which is present in the glass in mole percent of 0-3.0.

31. The glass composition of claim 8 wherein the components $Cs_2O$, $Rb_2O$ and $K_2O$ are present in the glass in mole percent of 0-3.

32. A glass composition comprising the following components present in the glass in the following mole percent ranges:

| | |
|---|---|
| $SiO_2$ | 35-43 |
| $B_2O_3$ | 22-28 |
| CaO | 0-6.5 |
| BaO | 20-32 |
| ZnO | 0-3 |
| $Y_2O_3$ | 0-1.4 |
| $As_2O_3$ | 0.5-0.6 |
| $Sb_2O_3$ | 0.4-0.6 |
| $Re_2O_3$ | 2.3-10.4 | wherein the $Re_2O_3$ comprises any one or more of the Lanthanum Group earth oxides, the total mole percent of which is within the above mole percent ranges for $Re_2O_3$.

33. The glass composition of claim 27 wherein the $Re_2O_3$ has a mole percent of 10.4.

34. The glass composition of claim 27 wherein the $Re_2O_3$ has a mole percent of 2.3.

35. The glass composition of claim 27 wherein the $Re_2O_3$ has a mole percent of 5.7.

36. A core glass for use in manufacturing a high performance microchannel plate, said core glass being formed of a glass composition comprising the following composition in mole percent ranges:

| | |
|---|---|
| $SiO_2$ | 35-43 |
| $B_2O_3$ | 22-28 |
| CaO | 0-6.5 |
| BaO | 20-32 |
| ZnO | 0-3 |
| $Y_2O_3$ | 0-1.4 |
| $As_2O_3$ | 0.5-0.6 |
| $Sb_2O_3$ | 0.4-0.6 |
| $Re_2O_3$ | 2.3-10.4 | wherein the $Re_2O_3$ comprises any one or more of the Lanthanum Group earth oxides, the total mole percent of which is within the above mole percent ranges for $Re_2O_3$, said core glass being in the form of a chemically etchable rod.

37. The core glass of claim 36 wherein the glass composition component $Re_2O_3$ has a mole percent of 10.4.

38. The core glass of claim 36 wherein the glass composition component $Re_2O_3$ has a mole percent of 2.3

39. The core glass of claim 36 wherein the glass composition component $Re_2O_3$ has a mole percent of 5.7.

* * * * *